S. K. BASSETT.
Steam-Plow.
No. 22,848.
Patented Feb. 8, 1859.
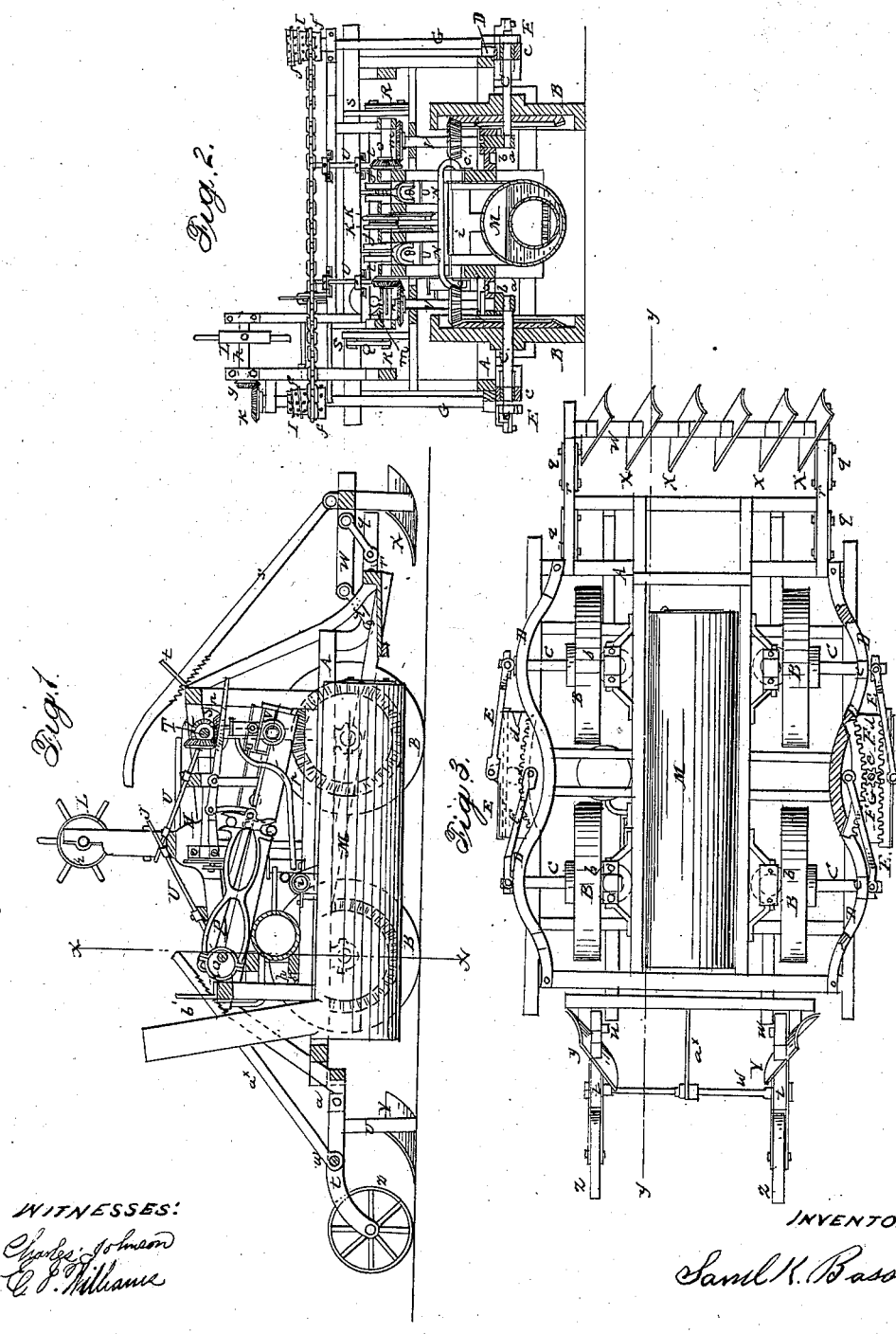

UNITED STATES PATENT OFFICE.

SAML. K. BASSETT, OF GALESBURG, ILLINOIS.

IMPROVEMENT IN STEAM-PLOWS.

Specification forming part of Letters Patent No. 22,848, dated February 8, 1859.

*To all whom it may concern:*

Be it known that I, S. K. BASSETT, of Galesburg, in the county of Knox and State of Illinois, have invented a new and Improved Steam-Plow; and I do hereby declare that the following is a full, clear, and exact description of the same, reference being had to the annexed drawings, making a part of this specification, in which—

Figure 1 is a side sectional view of my invention, taken in the line $y\ y$, Fig. 3. Fig. 2 is a transverse vertical section of the same, taken in the line $x\ x$, Fig. 1. Fig. 3 is an inverted plan of the same, a portion of one side of the machine being bisected horizontally in order to show clearly a certain portion of the working parts.

Similar letters of reference indicate corresponding parts in the several figures.

This invention consists in a peculiar manner of arranging the wheels of the truck of a traction steam-engine, as hereinafter fully shown and described, whereby the truck may be readily guided and turned, and the engine rendered available for drawing a gang of plows to turn over the earth in the usual way.

To enable those skilled in the art to fully understand and construct my invention, I will proceed to describe it.

A represents a truck which is formed of a rectangular frame, supported by four wheels, B—two at each side. The wheels B are each placed on a separate axle, C, and the inner journals, $a$, of the axles are fitted in bearings $b$, so arranged that they may turn as pivots and allow the axles C to be moved or adjusted curvilinearly from said bearings $b$ as centers. The outer ends of the axles C have their bearings $c$ fitted in curved guides D, attached to the truck, and to the outer end of each axle C a rod, E, is attached, said rods being connected at their inner ends to racks F. The two racks at each side of the truck are fitted in proper guides, $d$, and between each pair of racks a pinion, $e$, is fitted and gears into the racks. The pinions $e$ are placed on the lower ends of vertical shafts G, which extend upward at each side of the machine above a framing, H, on the truck.

On the upper part of each shaft G a cone-pulley, I, is attached, and the pulley I on one shaft is inverted or placed in a reverse position to that on the other, and an endless chain, J, passes around the two pulleys. (See Fig. 2.) The pulleys I are provided with teeth $f$, which are placed spirally on the pulleys, and between which teeth the chain J is fitted, the links of the chain catching against the teeth, which prevent the slipping of the same. On the upper end of one of the shafts G a bevel-wheel, K, is placed, and this wheel gears into a pinion, $g$, on a shaft, $h$, on which shaft a hand-wheel, L, is placed. (See Fig. 2.)

From the above description it will be readily seen that the truck A may be turned within a small compass and very expeditiously, for both pairs of wheels may be cramped simultaneously in reverse positions by turning the wheel L, the chain J communicating motion from one shaft to the other, and the pinions $e$ and racks F F communicating motion from the shafts G to the axles C of the wheels. In order to effect perfectly this short and expeditious turning of the truck, the wheels at the side of the truck which has the larger curve to describe are quickly distended or separated from each other by means of the cone-pulleys I, which, in consequence of their variable diameter and the direction in which the shafts are turned, will actuate the shafts G with unequal speed, the chain J passing from the larger to the smaller diameter of one pulley I and from the smaller to the larger diameter of the other. The wheels, therefore, are quickly distended or separated at one side, while those at the opposite side of course approach each other with a correspondingly slower speed.

M is a steam-boiler, which may be of any approved form. What is generally known as the "cylindrical flue-boiler" would, perhaps, be as desirable as any other. This boiler is attached or suspended to the truck A by trunnions $i$, the boiler being balanced thereon, so that it will remain in a horizontal position, and not be affected by the rising and falling of the truck caused by the inequalities of the surface of the ground. This will be clearly understood by referring to Figs. 1 and 2.

N N are two steam-cylinders, placed on the truck A side by side in an inclined position.

O is a driving-shaft placed in the framing H, the connecting-rods P of the cylinders being attached to cranks $j$ on said shaft O. On each end of the shaft O a crank-pulley, Q, is placed, and these pulleys are connected by rods R with crank-pulleys S on the ends of a shaft, T, which is on the back part of the framing H and parallel with the driving-shaft O. The cylinders N are provided with the usual valves operated from the shaft O by eccentrics $k$. On each shaft O T two bevel-pinions, $l\ l$, are placed loosely, and have levers U connected with them, so that they may be shoved on and off of a feather, $m$, on the shafts, and connected with and disconnected from said shaft, as may be desired. In each inner bearing, $b$, of the axles C the lower ends of vertical shafts V are stepped, as shown clearly in Fig. 2. To the upper end of each shaft V a bevel-wheel, $n$, is attached, the bevel-pinions $l$ gearing into the wheels $n$, and bevel-wheels $o$ are also attached to said shafts V, the wheels $o$ gearing into beveled wheels or rims $p$ at the inner sides of the wheels B. (See Fig. 2.) The truck A is propelled from the driving-shaft O by means of the gearing just described; and in case the engine should be wanted to be used temporarily as a stationary engine the pinions $ll$ are thrown out of gear with the wheels $n$ on the shafts V, the power being taken from a pulley on shaft O.

To the back part of the truck A a horizontal frame, W, is attached by arms $q$, said arms being pivoted to horizontal bars $r\ r$, which project from the truck. The arms $q$ insure a parallel movement of the frame W and admit of a rising-and-falling movement of the same, said frame being adjusted at any desired height by a notched bar, $s$, the upper end of which is fitted in a guide and step-plate, $t$.

To the back part of the frame W a series of plows, X, are placed side by side. The plows may be of usual construction, and may, by adjusting the bar $s$, be raised free from the ground and retained by the bar $s$ when the machine is being moved or drawn from place to place, or by adjusting the frame W the plows X may be made to penetrate the earth at a greater or less depth, in order to make the furrows of greater or less depth, as may be desired.

To the front end of the truck A two curved bars, $t\ t$, are attached by pivots $u\ u$. To the back part of each bar a pendant, $v$, is attached at right angles. These pendants form standards for plows Y, which are in line with the front wheels, B, of the truck. In the front end of the bars $t\ t$ wheels Z are placed, one in each. The two bars $t\ t$ are connected by a transverse rod, $w$, and to the rod $w$ a bar, $a^\times$, is attached, the bar $a^\times$ being notched at its upper end and fitted in a guide-plate, $b^\times$, attached to the framing H. The plows Y Y level the earth in front of the wheels B and facilitate the movement of the machine. These plows may also, when necessary, be elevated free from the ground by adjusting the bar $a^\times$.

The machine may be operated or driven by two persons—an engineer to drive the engine, and an attendant at the wheel L. The boiler is of course supplied with a necessary feed-pump, operated in any proper way.

Having thus described my invention, what I claim as new, and desire to secure by Letters Patent, is—

Having the wheels B of the truck A attached to separate axles C, with pivoted or swiveled inner bearings, $b$, the outer bearings of the axles being fitted in guides D, and the outer ends of the axles being connected by rods E with racks F, into which pinions $e$ of shafts G gear, the shafts being connected by the endless chains J passing around cone-pulleys I, placed in reverse positions on the shafts, the whole being arranged to operate substantially as shown and described, to facilitate the guiding and turning of the machine, as set forth.

SAML. K. BASSETT.

Witnesses:
JOHN W. PITMAN,
L. C. CONGER.